… … … …

United States Patent [19]

Sudo et al.

[11] 4,437,731

[45] Mar. 20, 1984

[54] LIQUID CRYSTAL DISPLAY DEVICE

[75] Inventors: Ryoichi Sudo, Yokosuka; Fusaji Shoji; Takeshi Watanabe, both of Yokohama; Kenkichi Suzuki, Mobara; Michio Ooue, Hitachi, all of Japan

[73] Assignee: Hitachi, Ltd., Tokyo, Japan

[21] Appl. No.: 274,680

[22] Filed: Jun. 17, 1981

[30] Foreign Application Priority Data

Jun. 18, 1980 [JP] Japan ................. 55-81452
Nov. 7, 1980 [JP] Japan ................. 55-155784

[51] Int. Cl.³ ............................................. G02F 1/13
[52] U.S. Cl. ............................ 350/340; 350/339 R
[58] Field of Search ......................... 350/339 R, 340

[56] References Cited

U.S. PATENT DOCUMENTS 3,728,008  4/1973  Allan et al. ................ 350/340
3,843,230  10/1974 Haas et al. ............... 350/340 X
3,867,015  2/1975  Iida et al. .................... 350/340

FOREIGN PATENT DOCUMENTS 2454413  6/1975  Fed. Rep. of Germany ...... 350/340

OTHER PUBLICATIONS

Mellan, I., *Industrial Solvents Handbook* (Noyes Data Corp., New Jersey 1970) Contents & pp. 143,164,165,294,301, & 453.

Primary Examiner—John K. Corbin
Assistant Examiner—Richard F. Gallivan
Attorney, Agent, or Firm—Antonelli, Terry & Wands

[57] ABSTRACT

A novel alignment film for liquid crystal is prepared by depositing an organic solvent solution of an alkylalkoxy silane and an alkoxymetallic compound of Ti, Zr, Ge onto an electrode-side surface of substrate, and curing the solution on the substrate by heating.

The alignment film shows good alignment for various types of liquid crystals and has long life.

11 Claims, 3 Drawing Figures

LIQUID CRYSTAL DISPLAY DEVICE

BACKGROUND OF THE INVENTION

1. Field of the Invention

This invention relates to a liquid crystal display device making use of the change of orientation of liquid crystal molecules which are aligned to a proper direction in advance by applying or changing the intensity of an electric field, a magnetic field, heat or the like, and more particularly to an alignment film of the display device.

2. Brief Description of the Prior Art

The liquid crystal display device is basically comprised of two glass substrates disposed in parallel with each other at a given distance, transparent electroconductive film strips being selectively disposed on the opposing surfaces of these two substrates, an alignment film for aligning liquid crystal molecules in a definite direction which completely covers each of said substrate surfaces and the electroconductive strips placed thereon, and a liquid crystal filling the space between the alignment films, the side faces of the device being tightly sealed lest any leakage of the liquid crystal should occur. At times it is further provided with a polarization plate on the outer surface of one of the substrates.

(A) Dynamic scattering type, (B) electric field induced birefrengence effect type, (C) guest-host effect type, (D) phase transition guest-host effect type, etc. are the well-known types of display system employing a device basically of the above-described structure, and (D) type system is the most practical one.

If the above-mentioned (D) type system is employed, (i) coloured display as well as black-and-white display can be made and (ii) the production cost can be reduced by the simplification of element structure. For this reason it is very likely that these systems will eventually replace the hitherto widely used twist-nematic electric field effect type display system employing horizontally aligned films. And in the use of system with vertical alignment of liquid crystal molecules, improved display characteristics can be achieved.

The following alignment films (a)–(e) have hitherto been used as films for aligning liquid crystal molecules vertically:

(a) Vapour-deposited films of rare earth metal oxides, etc.

(b) Films of silicon-containing metal oxides, etc.

(c) Film consisting of a surface active agent containing a long alkyl chain or fluoroalkyl chain group.

(d) Film of a complex compound of a carboxylic acid containing a long alkyl chain or fluoroalkyl chain group.

(e) Film of a silane compound containing a long alkyl chain or fluoroalkyl chain group.

The above alignment films, however, have the following disadvantages.

(i) Both alignment films (a) and (b) show different aligning ability, depending upon the kinds of liquid crystals, and no alignment is obtained at all, when some kinds of liquid crystal are used. Besides, their film surface is active so that they are likely to be contaminated with an organic compound gas, when a cell is assembled. In the case of the guesthost type display device, the film selectively adsorbs a dichroic dye added to the liquid crystal, resulting in poor alignment.

Moreover, a liquid display device will be expensive, because of use of an expensive vapor deposition apparatus and of many working steps involved.

(ii) Films (c) and (d) tend to lose their molecule aligning properties because of their poor heat-resisting property when they are heated during cell assembly. It is difficult to obtain a thick coat from these materials, and besides the coat is liable to include electroconductive substances therein and is easily released from the substrate. Thus, the life is poor.

(iii) Film (e) has a problem in coating, and a smooth film cannot be obtained. Thus, the alignment is poor. Furthermore, it is difficult to obtain a thick film and the life is poor.

Moreover, the pattern of the transparent electroconductive strips formed on the substrates appear too clearly as if embossed, because the film (e) has a refractive index of less then 1.6.

SUMMARY OF THE INVENTION

An object of the present invention is to provide a cheap liquid crystal display element of long life without any disadvantage of the above-mentioned prior art and any deterioration by heating at the cell assembling and with good alignment for various kinds of liquid crystal and less change with time in the alignment of liquid crystal.

The object can be attained by depositing a mixed solution of at least one compound selected from the following compounds of general formulae (1) to (4) as shown by the following group A and at least one compound selected from compounds of general formula (5) as shown by the following group B onto a substrate and then hardening the deposit by heating to obtain an alignment film.

Group A:

$$C_nH_{2n+1}Si(OR)_3 \quad (1)$$

$$C_nH_{2n+1}Si(OR)_2 \\ | \\ C_lH_{2l+1} \quad (2)$$

$$C_mF_{2m+1}(CH_2)_2Si(OR)_3 \quad (3)$$

$$C_mF_{2m+1}(CH_2)_2Si(OR)_2 \\ | \\ C_lH_{2l+1} \quad (4)$$

where $l=1–10$, $m=4–24$, $n=10–26$, and $R=$an alkyl group having not more than 10 carbon atoms.

Group B:

$$RO{-}\left[\begin{matrix} OR \\ | \\ MeO \\ | \\ OR \end{matrix}\right]_k{-}R \quad (5)$$

where Me=Ge, Ti, or Zr; R=an alkyl group having not more than 10 carbon atoms, and $k=1–30$.

In the present invention, a mixing ratio of at least one compound of general formula (5) as shown by group B to at least one compound of general formulae (1)–(4) as represented by group A is preferably in a range of Me/Si=0.1–8 in atomic ratio. At a ratio Me/Si of less than 0.1, it is difficult to obtain a homogeneous film and the resulting film will have extremely soft quality and a poor alignment. At a ratio of more than 8, vertical alignment of liquid crystal will be deteriorated.

A solvent for the present invention is not particularly restricted, so long as it can dissolve the compounds of general formulae (1)–(4) as shown by group A and the compound of general formula (5) as shown by group B simultaneously. Examples of suitable solvents include aromatic solvents such as toluene, xylene and tetralin, etc., higher alcohols of general formula $C_mH_{2m-k}OH$, wherein m is an integer of 8-20 and k is an integer of 0-m, such as n-decyl alcohol and tridecyl alcohol, and polyhydric alcohol derivatives such as ethyl cellosolve, butyl cellosolve, diethylene glycol butyl ether, n-butyl cellosolve acetate, n-butyl carbitol acetate, and diethylene glycol diethyl ether. They are distinguished in dissolvability and extendability, and thus are useful.

When a concentration of a mixture of at least one compound selected from the compounds of general formulae (1)–(4) as shown by the group A and at least one compound selected from the compounds of general formula (5) as shown by group B in a solvent is made to be 0.1–50% by weight, the solution can be applied by brush coating, dipping, spinner coating, spraying, printing, etc.

In the case of printing, use of higher alcohols as solvents is preferable to obtain solution stability, because the solution on the printing roll is influenced by humidity easily.

It is also preferable to add hydroxypropyl cellulose to the coating solution of the present invention, for it is effective for increasing the viscosity of the coating solution to obtain higher preciseness in pattern printing. Addition of about 0.5% by weight of hydroxypropyl cellulose can increase the viscosity of the coating solution from a few centipoises up to a few poises, and thus a large effect upon higher viscosity can be obtained. Moreover, hydroxypropyl cellulose gives no adverse effect upon the alignment of liquid crystal, so long as it is added thereto in an amount of less than one-fifth of that of the aligning material.

It is preferable to add a polydimethylsiloxane compound having a boiling point of less than 350° C., to the coating composition of the present invention, for it can increase the smoothness of film surface and is effective for improving the display grade as liquid crystal element. Restriction of the boiling point has such a significance that this compound should not remain in an ultimate film.

The polydimethylsiloxane has the following general formula (6) and may be either straight or cyclic;

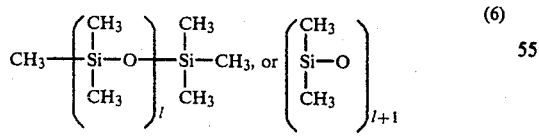

where l is a positive integer of not less than 2.

After the coating, the coated substrate is heated at 100°-250° C., preferably at 150°-200° C., to evaporate the solvent and cross-link the coat material. At less than 100° C., the evaporation of solvent and the cross-linking reaction of coat material cannot be thoroughly carried out, whereas at more than 250° C., the long alkyl chain group or long fluoroalkyl chain group will be thermally decomposed, lowering the alignment of liquid crystal.

The thickness of alignment film of the present invention is 0.005-1 μm, preferably 0.01-0.1 μm.

Liquid crystal to be used in combination with the alignment film of the present invention is not particularly limited, and is the well known one. For example, it includes nematic liquid crystal such as Schiff's base type, azo type, azoxy type, biphenyl type, ester type, terphenyl type, phenylcyclohexane type, phenylcyclohexane ester type, phenylpyrimidine type, etc., cholesteric liquid crystal formed by adding a cholesterol derivative (0.05-5% by weight), a chiral nematic liquid crystal or the like to the nematic liquid crystal, a mixture of the nematic liquid crystals, and a mixture of the cholesteric liquid crystal, etc.

Organic resins, such as epoxy resins, which can be cured at the lower temperature than 230° C. within 2 hours can be used as fusion sealers or sealers for cell assembly in combination with the alignment film of the present invention.

Transparent electrode is comprised of tin oxide and indium oxide as the main components and can be formed on a glass or plastic substrate by vacuum vapor deposition, etc.

BRIEF DESCRIPTION OF THE DRAWINGS

In FIGS. 1 to 3, 1 indicates a glass substrate, 2 a $SiO_2$ protective film, 3 transparent electroconductive strips, 4 an alignment film, 5 fusion sealing, 6 liquid crystal, and 7 a polarization film.

DETAILED DESCRIPTION OF PREFERRED EMBODIMENTS

The following examples are given to illustrate the present invention in detail.

EXAMPLE 1

Figure 1:
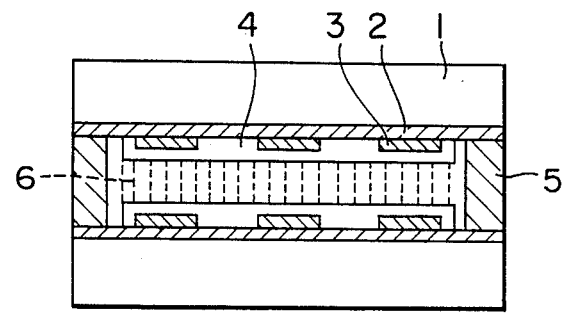
FIG. 1 shows a liquid crystal display element of such a structure that a $SiO_2$ protective film 2 is disposed an a glass substrate 1, transparent electroconductive strips 3 are disposed selectively at desired position thereon, and an alignment film 4 is disposed thereon to cover the strips 3 completely.

A $SiO_2$ protective film 2 having a film thickness of 300 Å was formed on a glass substrate 1 by spattering vapor deposition as shown in FIG. 1. Then, a film of $In_2O_3$ and $SnO_2$ (20:1) having a film thickness of 300 Å was formed thereon by vapor deposition in the same manner as above, and then photo-etched to selectively form transparent electroconductive strips 3.

On the other hand, various alkylalkoxysilanes (compounds of group A) were each mixed with tetra-n-butyl titanate in ratios as shown in Table 1 and the resulting mixtures were each dissolved in n-butyl cellosolve to prepare solutions having a concentration of 2% by weight of the mixture.

The resulting solutions were applied to the respective substrates 1 as prepared above by spinner coating to completely cover the transparent electroconductive strips 3. Then, the coat films were heated at 100° C. for one hour and then at 200° C. for one hour successively to form an alignment film 4. Two substrates 1 of same kind thus prepared were disposed in parallel with each other to face the alignment films 4 each other at a distance of 8 μm, and sealed at the sides with epoxy resin except a liquid crystal inlet (not shown in the drawing) as fusion part 5 by heating at 180° C. for one hour to form a cell.

Thereafter, a liquid crystal 6 was introduced in cell through the liquid crystal inlet (not shown in the drawing).

The following liquid crystals were introduced in the cell.

(a) A mixture of biphenyl type liquid crystals

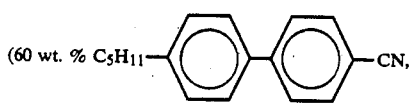

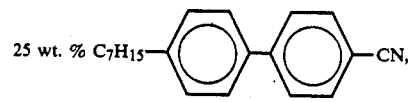

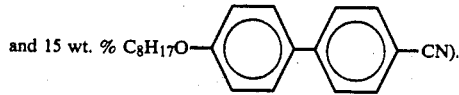

(b) A mixture of ester type liquid crystals

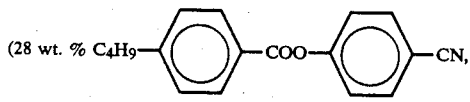

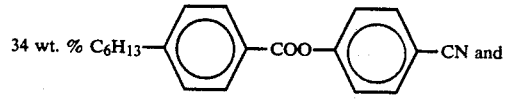

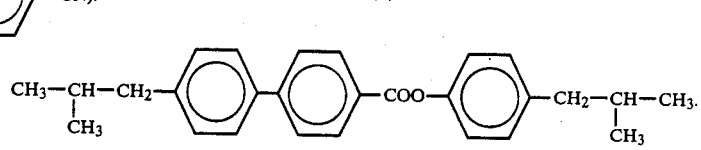

(c) A mixture of phenylcyclohexane type liquid crystals (d) A cholesteric liquid crystal prepared by adding a liquid crystal mixture (c) 0.95 wt.% of (e) The liquid crystal (d) further containing as a bichrome pigment 2 wt.% of

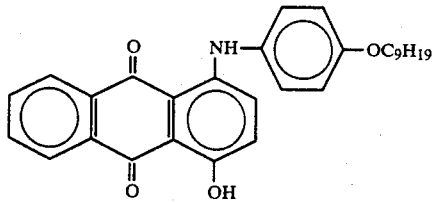

After the liquid crystal inlet was sealed with the epoxy resin, the aligning properties of the liquid crystal in the cell were examined.

When aligned vertically to the alignment film surface, liquid crystals (a) to (e) took a homeotropic state.

TABLE 1

| Number of carbon atoms of long alkyl chaim group | Compound of group A | Classification | | | | | | | | |
|---|---|---|---|---|---|---|---|---|---|---|
| | | Comp. Ex. | Examples Ti/Si (atomic ratio) | | | | | | | Reference Examples |
| | | 0/1 | 0.1 | 0.5 | 1 | 2 | 4 | 6 | 8 | 10 | 1/0 |
| 1 | $CH_3Si(OC_2H_5)_3$ | x | x | x | x | x | x | x | x | x | x |
| 8 | $C_8H_{17}Si(OC_2H_5)_3$ | x | x | x | x | x | x | x | x | x | x |
| 12 | $C_{12}H_{25}Si(OC_2H_5)_3$ | Δ | x | x | x | x | x | x | x | x | x |

TABLE 1-continued

| Number of carbon atoms of long alkyl chaim group | Compound of group A | Classification |||||||||
|---|---|---|---|---|---|---|---|---|---|---|
| | | Comp. Ex. | Examples ||||||| Reference Examples |
| | | | Ti/Si (atomic ratio) |||||||
| | | 0/1 | 0.1 | 0.5 | 1 | 2 | 4 | 6 | 8 | 10 | 1/0 |
| 14 | $C_{14}H_{29}Si(OCH_3)_3$ | Δ | o | o | o | o | o | o | o | x | x |
| 16 | $C_{16}H_{33}Si(OCH_3)_3$ | Δ | o | o | o | o | o | o | o | x | x |
| 18 | $C_{18}H_{37}Si(OC_2H_5)_3$ | Δ | o | o | o | o | o | o | o | x | x |
| 20 | $C_{20}H_{41}Si(OCH_3)_3$ | Δ | o | o | o | o | o | o | o | x | x |

Liquid crystal alignment:
o: Good vertical alignment
Δ: Somewhat disturbed vertical alignment
x: No vertical alignment attained As shown in Table 1 satisfactory vertical alignment was obtained when the long alkyl chain group had 12 or more carbon atoms and the compounds of group A was mixed with tetra-n-butyl titanate in a ratio of Ti/Si=0.1 to 8 (atomic ratio).

The display device using liquid crystal (e) showed good alignment and could perform excellent colour display according to phase transition guest-host type display system.

Figure 2:
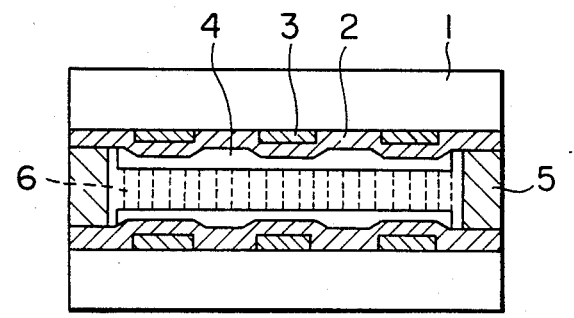
FIG. 2 shows a liquid crystal display element of such a structure that transparent electroconductive strips 3 are disposed selectively at desired positions directly on a glass substrate 1, a $SiO_2$ protective film 2 is disposed thereon to cover both substrate 1 and strips 3 completely, and an alignment film 4 is placed on the protective film 2.
Figure 3:
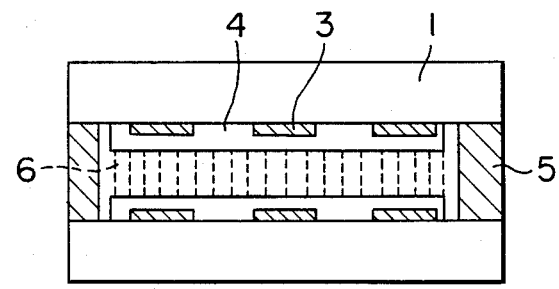
FIG. 3 shows a liquid crystal display element of such a structure that transparent electroconductive strips 3 are disposed selectively at desired positions directly on a glass substrate 1 and an alignment film 4 is disposed thereon to completely cover both strips 3 and exposed portions of glass substrate 1.

Similar results as in the case of FIG. 1 were obtained in the device with a $SiO_2$ film 2 as shown in FIG. 2 and in the device without the $SiO_2$ film, as shown in FIG. 3.

EXAMPLE 2

Various fluoroalkylalkoxysilanes and fluoroalkylalkylalkoxysilanes (compounds of group A) were each mixed with tetra-n-butyl titanate in ratios shown in Table 2, and the resulting mixtures were each dissolved in methyl isobutyl ketone to prepare solutions having a concentration of 2% by weight of the mixture. Liquid crystal display devices were made with the resulting solution in the same manner as in Example 1. As shown in Table 2, satisfactory vertical alignment was obtained when the long fluoroalkyl chain group had 6 or more carbon atoms and tetra-n-butyl titanate was mixed with the silane in a ratio of Ti/Si=0.1 to 8 (atomic ratio).

EXAMPLE 3

An equimolar mixture of compounds (a) and (b) as shown in Table 3 was mixed with an equimolar amount of tetra-n-butyl titanate, and the resulting mixture was dissolved in methyl isobutyl ketone to prepare a solution having a concentration of 2% by weight of the resulting mixture. Liquid crystal display devices were made from the resulting solutions in the same manner as in Example 1. The devices had satisfactory vertical alignment as shown in Table 3.

EXAMPLE 4

Octadecyltriethoxysilane was mixed with various alkoxy compounds of Si, Ge, Zr, or Ti, which will be hereinafter referred to generally as "Me", in ratios shown in Table 4, and the mixtures were each dissolved in a mixed solvent of equal weights of n-butyl cellosolve and n-decyl alcohol to prepare solutions having a 2 wt.% concentration of the mixture. Liquid crystal display devices were made from these solutions in the same manner as in Example 1.

As shown in Table 4, satisfactory vertical alignment was obtained when an alkoxy compound of Ge, Zr or Ti and their oligomers were used in a ratio of Me/Si=0.1–8 (atomic ratio), whereas no satisfactory vertical alignment was obtained when $Si(OC_2H_5)_4$ was used (Comparative Example).

TABLE 2

| Number of carbon atoms of long fluoro-alkyl chain group | Compound of group A | Classification |||||||||
|---|---|---|---|---|---|---|---|---|---|---|
| | | Comp. Ex. | Examples ||||||| Reference Ex. |
| | | | Ti/Si (atomic ratio) |||||||
| | | 0/1 | 0.1 | 0.5 | 1 | 2 | 4 | 6 | 8 | 10 | 1/0 |
| 3 | $CF_3(CH_2)_2Si(OCH_3)_3$ | x | x | x | x | x | x | x | x | x | x |
| 6 | $C_4F_9(CH_2)_2Si(OCH_3)_2$<br>               \|<br>               $CH_3$ | x | o | o | o | o | o | o | o | x | x |
| 10 | $C_8F_{17}(CH_2)_2Si(OCH_3)_3$ | x | o | o | o | o | o | o | o | x | x |
| 10<br>10 | $C_8F_{17}(CH_2)_2Si(OCH_3)_2$<br>               \|<br>               $CH_3$ | x | o | o | o | o | o | o | o | x | x |

Liquid crystal alignment:
o: Good vertical alignment
x: No vertical alignment attained

TABLE 3

| (b) | (a) C₁₈H₃₇Si(OC₂H₅)₃ | C₁₂H₂₅Si(OC₂H₅)₃ | C₈F₁₇(CH₂)₂Si(OCH₃)₃ |
|---|---|---|---|
| $C_{18}H_{37}Si(OC_2H_5)_3$ |  | o | o |
| $C_{16}H_{33}Si(OCH_3)_3$ | o | o | o |
| $C_{14}H_{27}Si(OCH_3)_3$ | o | o | o |
| $C_{18}H_{37}Si(OCH_3)_2$<br>\|<br>$CH_3$ | o | o | o |
| $C_{16}H_{33}Si(OCH_3)_2$<br>\|<br>$CH_3$ | o | o | o |
| $C_8F_{17}(CH_2)_2Si(OCH_3)_2$<br>\|<br>$CH_3$ | o | o | o |
| $C_4F_9(CH_2)_2Si(OCH_3)_2$<br>\|<br>$CH_3$ | o | o | o |

Liquid crystal alignment:
o: Good vertical alignment.

TABLE 4

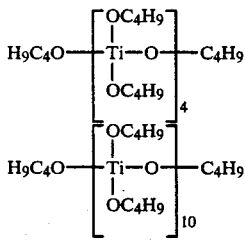

| Classification | Compound ($C_4H_9-$ = n-$C_4H_9-$) | Me/Si (atomic ratio) |||||||||| 
|---|---|---|---|---|---|---|---|---|---|---|---|
| | | 0/1 | 0.1 | 0.5 | 1 | 2 | 4 | 6 | 8 | 10 | 1/0 |
| Comp. Ex. | $Si(OC_2H_5)_4$ | Δ | Δ | Δ | Δ | x | x | x | x | x | x |
| Ref. Ex. and Examples (within double line framework) | $Ge(OC_4H_9)_4$ | | o | o | o | o | o | o | o | x | x |
| | $Zr(OC_4H_9)_4$ | | o | o | o | o | o | o | o | x | x |
| | $Ti(OC_4H_9)_4$ | | o | o | o | o | o | o | o | x | x |
| | (Ti polymer, n=4) | | o | o | o | o | o | o | o | x | x |
| | (Ti polymer, n=10) | | o | o | o | o | o | o | o | x | x |

Liquid crystal alignment:
o: Good vertical alignment
Δ: Somewhat disturbed vertical alignment
x: No vertical alignment

EXAMPLE 5

An equimolar mixture of hexadecyltrimethoxysilane and i-propyl titanate was dissolved in n-butyl cellosolve to prepare solutions having 2, 5, 10, and 20 wt.% concentrations of the silane and the titanate mixture.

Liquid crystal display devices were made from these solutions in the same manner as in Example 1.

The film thickness of the alignment films was 150 Å with the solution having a 2 wt.% concentration, 300 Å with the solution having a 5 wt.% concentration, 500 Å with the solution having a 10 wt.% concentration, and 1,400 Å with the solution having a 20 wt.% solution. Liquid crystals showed a satisfactory vertical alignment in the liquid crystal display devices with these alignment films.

EXAMPLE 6

The phenomenon that the patterns of a transparent electroconductive strips appear as if embossed could be reduced at Ti/Si=2 or more (atomic ratio) and a film thickness of 500 Å or more in the compositions of Table 1, when the liquid crystal devices were assembled.

EXAMPLE 7

The display devices of the present invention shown in Examples 1–6 could have normal performance characteristics after a high temperature exposure test (70° C., 1000 hours), a high temperature-high humidity exposure test (70° C., 95% RH, 250 hours), and current passage test (10 V DC, 100 hours and 12 V, 32 Hz, 1,000 hours).

EXAMPLE 8

Tridecanol, a higher alcohol of hydrocarbons having 8 or more carbon atoms, was used as a solvent. Octadecyltriethoxysilane as an alkylalkoxysilane having a long alkyl chain group and tetrabutyltitanate as an alkoxymetallic compound were dissolved in the solvent in a Ti/Si ratio of 6/1 and at a concentration of 20 wt.% of the sum total of octadecyltriethoxysilane and tetrabutyltitanate. The solution remained homogeneous and transparent even after being left standing on a rotary roll for 4 hours.

The resulting solution was applied to a glass substrate by transfer printing to form an alignment film. No accurate print patterns of alignment film could be obtained in this case.

After drying off the solvent, the substrate was heated at 180° C. for one hour, and then various nematic liquid crystals as given before were inserted between the two substrates, and a good homeotropic alignment was obtained. In the case various cholesteric liquid crystals as given before were used, homeotropic alignment was obtained when the gap between the substrates was smaller than the 180° turning pitch of the cholesteric liquid crystal, and a focal-conic alignment was obtained when the gap was larger than the 180° turning pitch.

The alignment effects could remain intact even after the process of assembling display elements with epoxy resin at 180° C. for 2 hours.

EXAMPLE 9

α-Terepineol, a higher alcohol of hydrocarbon having 8 or more carbon atoms, was used as a solvent. Hexadecyltrimethoxysilane as an alkylalkoxysilane having a long alkyl chain group and tetrabutoxy titanate decamer as an alkoxymetallic compound were dissolved in the solvent in a ratio of Ti/Si of 4/1 and at a concentration of 10 wt.% of the mixture.

The solution was examined in the same manner as in Example 8 and the same results as those of Example 8 were obtained.

EXAMPLE 10 p-Isopropylbenzyl alcohol, a higher alcohol of hydrocarbons having 8 or more carbon atoms, was used as solvent. Tetradecyltriethoxy silane as an alkylalkoxysilane having a long alkyl chain group and tetraoctyltitanate as an alkoxymetallic compound were dissolved in the solvent in a ratio of Ti/Si of 8/1 and at 5 wt.% concentration of the mixture.

The solution was examined in the same manner as Example 8 and the same results as those of Example 8 were obtained.

EXAMPLE 11

To the coating solutions used in Examples 8–10, 0.5% by weight (based on the coating solution) of hydroxypropylcellulose was added and the resulting coating solution had a viscosity of 2–3 poises. The solutions could remain transparent and homogeneous after being left standing on a rotary roll for 4 hours.

Then, the coating solutions were applied to glass substrates to form alignment films by transfer printing. In this case accurate printing patterns could be obtained but the smoothness of the alignment film surfaces was somewhat poor.

Liquid crystal alignment was examined in the same manner as in Example 8, and the same results as those of Example 8 were obtained.

EXAMPLE 12

To the coating solutions used in Example 11, 10% by weight (based on the solutions) of a cyclic polydimethylsiloxane compound having a boiling point of about 220° C. was added.

The resulting coating solutions were examined in the same manner as in Example 8 and it was found that the stability of the coating solutions, accuracy of printing patterns and smoothness of the film surfaces were all satisfactory. Liquid crystal alignment of films were as good as those of the film of Example 8.

As a result, a guest-host type liquid crystal display element with a good display grade could be made from the respective coating solutions.

EXAMPLE 13

To the coating solutions used in Example 11, 5% by weight (based on the solution) of a straight-chain polydimethylsiloxane compound having a boiling point of about 250° C. was added.

The resulting coating solutions were examined in the same manner as in Example 12 and the same good results as those of Example 12 were obtained.

What is claimed is:

1. A liquid crystal display device having a liquid crystal layer interposed between a pair of substrates with electrodes formed thereon, which comprises an alignment film being provided on each of opposing surfaces of the pair of substrates by mixing at least one compound selected from the following group A of organosilicon compounds represented by the general formulae (1) to (4) with at least one compound selected from the following group B of organometallic compound represented by general formula (5) in an atomic ratio of metallic atoms in organo-metallic compound to silicon atoms in organosilicon compounds of 1/10–8/1, dissolving the mixture in an organic solvent, applying the resulting solution to the substrate, and curing the solution;

Group A:

$$C_nH_{2n+1}Si(OR)_3 \tag{1}$$

$$C_nH_{2n+1}\underset{\underset{C_lH_{2l+1}}{|}}{Si(OR)_2} \tag{2}$$

$$C_mF_{2m+1}(CH_2)_2Si(OR)_3 \tag{3}$$

$$C_mF_{2m+1}(CH_2)_2\underset{\underset{C_lH_{2l+1}}{|}}{Si(OR)_2} \tag{4}$$

where l=1–10, m=4–24, n=10–26, and R represents an alkyl group having not more than 10 carbon atoms, $$RO-\left(\begin{matrix} OR \\ | \\ Me-O \\ | \\ OR \end{matrix}\right)_k R \tag{5}$$

where Me is Ge, Ti, or Zr; R represents an alkyl group having not more than 10 carbon atoms and k=1–30.

2. The liquid crystal display device according to claim 1, wherein the organosilicon compound is $C_{12}H_{25}Si(OC_2H_5)_3$, $C_{14}H_{29}Si(OCH_3)_3$, $C_{14}H_{29}Si(OC_2H_5)_3$, $C_{16}H_{33}Si(OCH_3)_3$, $C_{18}H_{37}Si(OC_2H_5)_3$, $C_{20}H_{41}Si(OCH_3)_3$, $C_4F_9(CH_2)_2Si(OCH_3)_2$, $C_8F_{17}(CH_2)_2\underset{\underset{CH_3}{|}}{Si(OCH_3)_3}$, -continued $C_8F_{17}(CH_2)_2Si(OCH_3)_2$,
|
$CH_3$ an equimolar mixture of $C_{18}H_{37}Si(OC_2H_5)_3$ and $C_{12}H_{25}Si(OC_2H_5)_3$, an equimolar mixture of $C_{18}H_{37}Si(OC_2H_5)_3$ and $C_8F_{17}(CH_2)_2Si(OCH_3)_3$, an equimolar mixture of $C_{16}H_{33}Si(OCH_3)_3$ and $C_{12}H_{25}Si(OC_2H_5)_3$, an equimolar mixture of $C_{16}H_{33}Si(OCH_3)_3$ and $C_8F_{17}(CH_2)_2Si(OCH_3)_3$, an equimolar mixture of $C_{16}H_{33}Si(OCH_3)_3$ and $C_{18}H_{37}Si(OCH_3)_3$, an equimolar mixture of $C_{14}H_{29}Si(OCH_3)_3$ and $C_{18}H_{37}Si(OC_2H_5)_3$, an equimolar mixture of $C_{14}H_{29}Si(OCH_3)_3$ and $C_{12}H_{25}Si(OC_2H_5)_3$, an equimolar mixture of $C_{14}H_{29}Si(OCH_3)_3$ and $C_8F_{17}(CH_2)_2Si(OCH_3)_3$, an equimolar mixture of $C_{18}H_{37}Si(CH_3)(OCH_3)_2$ and $C_{18}H_{37}Si(OC_2H_5)_3$, an equimolar mixture of $C_{18}H_{37}Si(CH_3)(OCH_3)_2$ and $C_{12}H_{25}Si(OC_2H_5)_3$, an equimolar mixture of $C_{18}H_{37}Si(CH_3)(OCH_3)_2$ and $C_8F_{17}(CH_2)_2Si(OCH_3)_3$, an equimolar mixture of $C_{16}H_{33}Si(CH_3)(OCH_3)_2$ and $C_{18}H_{37}Si(OC_2H_5)_3$, an equimolar mixture of $C_{16}H_{33}Si(CH_3)(OCH_3)_2$ and $C_{12}H_{25}Si(OC_2H_5)_3$, an equimolar mixture of $C_{16}H_{33}Si(CH_3)(OCH_3)_2$ and $C_8F_{17}(CH_2)_2Si(OC_2H_5)_3$, an equimolar mixture of $C_8F_{17}(CH_2)_2Si(CH_3)(OCH_3)_2$ and $C_{18}H_{37}Si(OC_2H_5)_3$, an equimolar mixture of $C_{18}F_{37}(CH_2)_2Si(CH_3)(OCH_3)_2$ and $C_{12}H_{25}Si(OC_2H_5)_3$, an equimolar mixture of $C_8F_{17}(CH_2)_2Si(CH_3)(OCH_3)_2$ and $C_8F_{17}(CH_2)_2Si(OCH_3)_3$, an equimolar mixture of $C_4F_9(CH_2)_2Si(CH_3)(OCH_3)_2$ and $C_{18}H_{37}Si(OC_2H_5)_3$, an equimolar mixture of $C_4F_9(CH_2)_2Si(CH_3)(OCH_3)_2$ and $C_{12}H_{25}Si(OC_2H_5)_3$, or an equimolar mixture of $C_4F_9(CH_2)_2Si(CH_3)(OCH_3)_2$ and $C_8F_{17}(CH_2)_2Si(OCH_3)_3$; the organometallic compound is tetra-n-butyl titanate, tetraoctyltitanate, tetrabutyl titanate tetramer and decamer, tetrabutylgermanate, tetrabutylzirconate, and the organic solvent is toluene, xylene, tetralin, alcohols represented by general formula $C_mH_{2m-k}OH$ (where m is an integer of 8-20, and k is an integer of 0-m), ethyl cellosolve, butyl cellosolve, diethylene glycol butyl ether, n-butyl cellosolve acetate, n-butyl carbitol acetate, diethylene glycol diethyl ether, α-terpineol, p-isopropylbenzyl alcohol, tridecanol, methyl isobutyl ketone, or an equimolar mixture of n-butyl cellosolve and n-decyl alcohol.

3. The liquid crystal display device according to claim 1, wherein said solution applied to the substrate also includes hydroxypropyl cellulose.

4. The liquid crystal display device according to claim 3, wherein the hydroxypropyl cellulose is included in said solution in an amount of 0.5% by weight.

5. The liquid crystal display device according to claim 1, wherein said solution applied to the substrate also includes a polydimethylsiloxane compound having a boiling point of less than 350° C.

6. The liquid crystal display device according to claim 1, wherein the solution is cured by heating the substrate havind had the solution applied thereto at a temperature of 100°-250° C.

7. The liquid crystal display device according to claim 1, wherein the alignment film has a thickness of 0.005-1 μm.

8. The liquid crystal display device according to claim 7, wherein the thickness of the alignment film is 0.01-0.1 μm.

9. The liquid crystal display device according to claim 1, wherein the liquid crystal layer is made of a material selected from the group consisting of:

(a) a mixture of biphenyl liquid crystals of

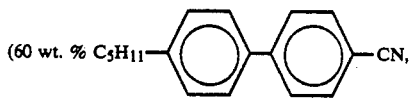
(60 wt. % $C_5H_{11}$—⬡—⬡—CN,

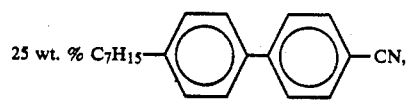
25 wt. % $C_7H_{15}$—⬡—⬡—CN,

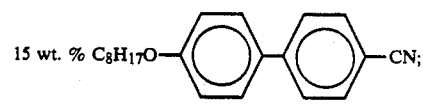
15 wt. % $C_8H_{17}O$—⬡—⬡—CN;

and (b) a mixture of ester liquid crystals of

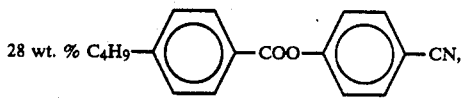
28 wt. % $C_4H_9$—⬡—COO—⬡—CN,

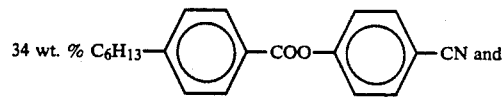
34 wt. % $C_6H_{13}$—⬡—COO—⬡—CN and

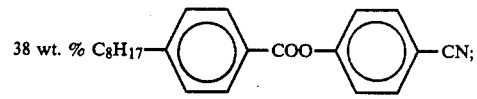
38 wt. % $C_8H_{17}$—⬡—COO—⬡—CN;

(c) a mixture of phenylcyclohexane liquid crystals of

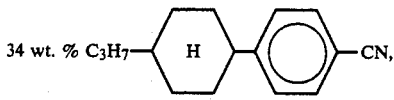
34 wt. % $C_3H_7$—H—⬡—CN, 34 wt. % $C_5H_{11}$—H—⬡—CN,

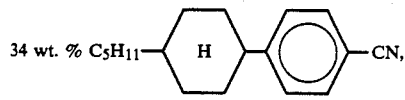
20 wt. % $C_7H_{15}$—H—⬡—CN,

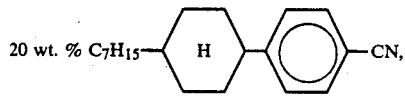
and 12 wt. % $C_7H_{15}$—H—⬡—⬡—CN;

(d) a cholesteric liquid crystal prepared by adding to liquid crystal mixture (c) 0.95 wt.% of

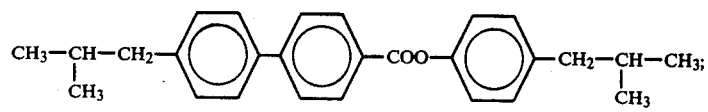

and (e) the liquid crystal (d) further containing as a bichrome pigment 2 wt.% of

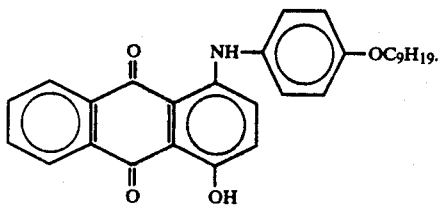

10. The liquid crystal display device according to claim 1, wherein the liquid crystal layer is made of a nematic liquid crystal, a mixture of nematic liquid crystals, a cholesteric liquid crystal, or a mixture of cholesteric liquid crystals.

11. The liquid crystal display device according to claim 1, wherein Me is Ti, the Ti/Si ratio is 2/1 to 8/1, and the alignment film has a thickness of at least 500 Å.

* * * * *